INVENTOR
J. D. FOULKES
BY Kenneth B. Hamlin
ATTORNEY

Nov. 19, 1963 J. D. FOULKES 3,111,651

MAGNETIC CORE MATRIX APPARATUS

Filed Oct. 10, 1957 5 Sheets-Sheet 2

INVENTOR
J. D. FOULKES
BY Kenneth B. Hamlin
ATTORNEY

Nov. 19, 1963 J. D. FOULKES 3,111,651

MAGNETIC CORE MATRIX APPARATUS

Filed Oct. 10, 1957 5 Sheets-Sheet 3

INVENTOR
J. D. FOULKES
BY Kenneth B. Hamlin
ATTORNEY

INVENTOR
J. D. FOULKES
BY Kenneth B Hamlin
ATTORNEY

Nov. 19, 1963 J. D. FOULKES 3,111,651

MAGNETIC CORE MATRIX APPARATUS

Filed Oct. 10, 1957 5 Sheets-Sheet 5

INVENTOR
J. D. FOULKES
BY Kenneth B. Hamlin
ATTORNEY

United States Patent Office 3,111,651
Patented Nov. 19, 1963

3,111,651

MAGNETIC CORE MATRIX APPARATUS

John D. Foulkes, Bernardsville, N.J., assignor to Bell Telephone Laboratories, Incorporated, New York, N.Y., a corporation of New York Filed Oct. 10, 1957, Ser. No. 689,418
18 Claims. (Cl. 340—174)

This invention relates to magnetic memory devices and more particularly to magnetic core memory matrix constructions and the methods of their fabrication.

The extensive use of magnetic cores for the purpose of storing two-state binary information in data processing and information handling systems, for example, has brought to the fore the problem of providing a simple and expeditious means for assembling and wiring the magnetic core circuits. This problem is encountered in particular in the assembly of large scale core memory matrices where present manual fabrication and wiring techniques have proven not only tedious and time consuming but uneconomical as well. Even where the cores of a matrix are merely threaded by the circuit wiring rather than actually wound on the cores, manual fabrication has not been completely satisfactory. Further, the methods and constructions heretofore employed do not universally lend themselves to faster mechanized techniques which may become available.

Some specific solutions to this fabricating problem have been offered and present possibly advantageous means for achieving a faster and more economical assembly of the core matrices. Such, for example, is the structure and method of fabrication described in the copending application of J. J. Madden, filed July 24, 1957, Serial No. 673,814 now Patent No. 3,031,736. An additional requirement frequently imposed on a magnetic core matrix is that the structure be reduced in size as far as the physical dimensions of the individual cores will permit. Few of the hitherto known means of meeting the problem of fabrication have at the same time resulted in a magnetic core matrix construction which also satisfies the demand for size limitations.

Accordingly it is an object of the present invention to accomplish the storage of binary information by means of a new and novel magnetic core memory matrix construction.

It is another object of this invention to facilitate the fabrication of magnetic core memory matrices.

Another object of this invention is to provide a magnetic core memory matrix incorporating principles of construction such as to simplify its assembly and at the same time result in a smaller, more compact unit than hitherto obtainable.

Yet another object of this invention is a magnetic core memory matrix construction which readily lends itself to interchangeability within the systems with which employed.

A further object of this invention is the provision of a magnetic core memory matrix construction which is advantageously adaptable to mechanized assembly techniques.

These among other objects of this invention are realized in one illustrative embodiment thereof comprising a spindle which has a plurality of non-magnetic discs rotatably mounted thereon. The discs are separated from each other by non-magnetic washers of smaller diameter, which washers are also mounted on the spindle. Each of the discs is provided with a plurality of apertures having their centers equidistant from the axis of the spindle, each aperture being adapted to hold a magnetic core. In accordance with one feature of this invention the discs may be rotated about the spindle in a manner such as to realize particular alignments of the cores along common axes. Thus, assuming the magnetic cores to be of a substantially toroidal form, corresponding cores of the discs are in this manner brought into a first alignment having their axes parallel with the axis of the spindle. Inductive coupling with associated circuit elements is now readily accomplished by threading corresponding cores of the discs in the first alignment with suitable electrical conductors.

According to another feature of this invention the discs may now be rotated relative to one another such that a new alignment of the cores in the disc apertures is established. The cores of this second alignment are now again threaded by suitable electrical conductors. Still another relative rotation of the discs to re-align the cores into a third alignment and a third threading of the cores of this latter alignment completes the wiring of a basic memory matrix according to the principles of this invention. Thus, the wiring of the first alignment may advantageously comprise the X coordinate wiring of an effective coincident current coordinate memory array and the wiring of the second alignment may comprise the Y coordinate wiring of such an array. If the wiring of the third alignment is made continuous a read-out conductor is conveniently provided. The ends of the threading conductors may advantageously be connected to suitable pins provided on enclosing plates also mounted on the spindle mounting the core discs.

According to still another feature of this invention the matrix structure described hereinbefore may be rendered more compact by arranging the plurality of apertures and cores in each disc in two concentric circles both of which are concentric with the axis of the mounting spindle. This arrangement is, in effect, in the fashion of folding one half of the cylindrically disposed cores of the structure above described over the other half of the cores. In such an arrangement both terminals of the X and Y coordinate conductors emerge from the same end of the matrix structure, the structure thus presenting a convenient module which may readily be connected to associated switching and other circuits by means of the protruding pins of the enclosing plate.

The foregoing and other objects and features of the present invention will be readily understood from a consideration of the detailed description thereof which follows when taken in conjunction with the accompanying drawing in which.

Figure 9:
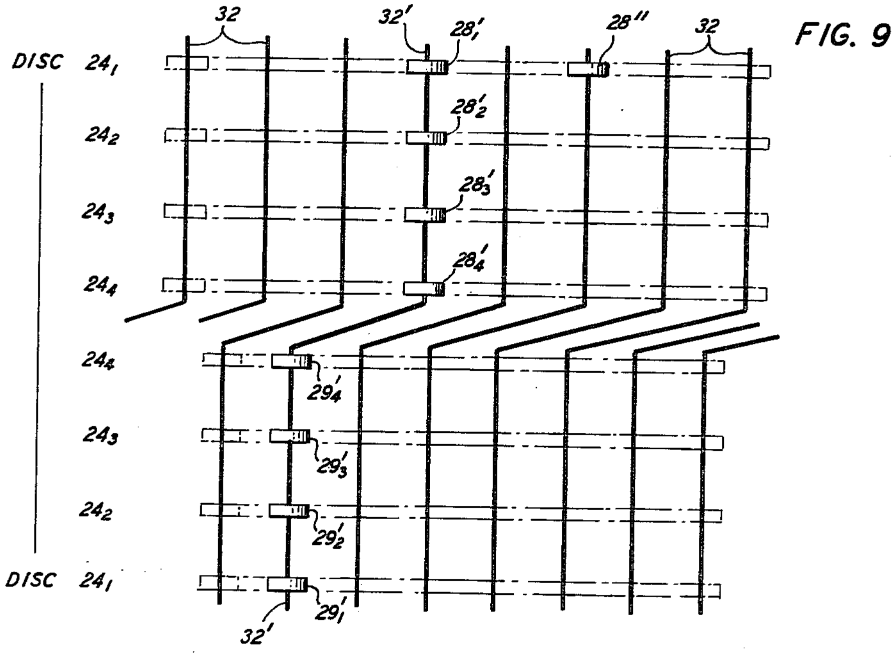
FIG. 9 is a diagrammatic presentation of the relative positions of the cores of the illustrative embodiment of FIG. 7 and FIG. 8 envisioned as unfolded and unrolled from their actual cylindrical, concentric arrangement; the cores are shown as having first columnar conductors threaded therethrough.
Figure 10:
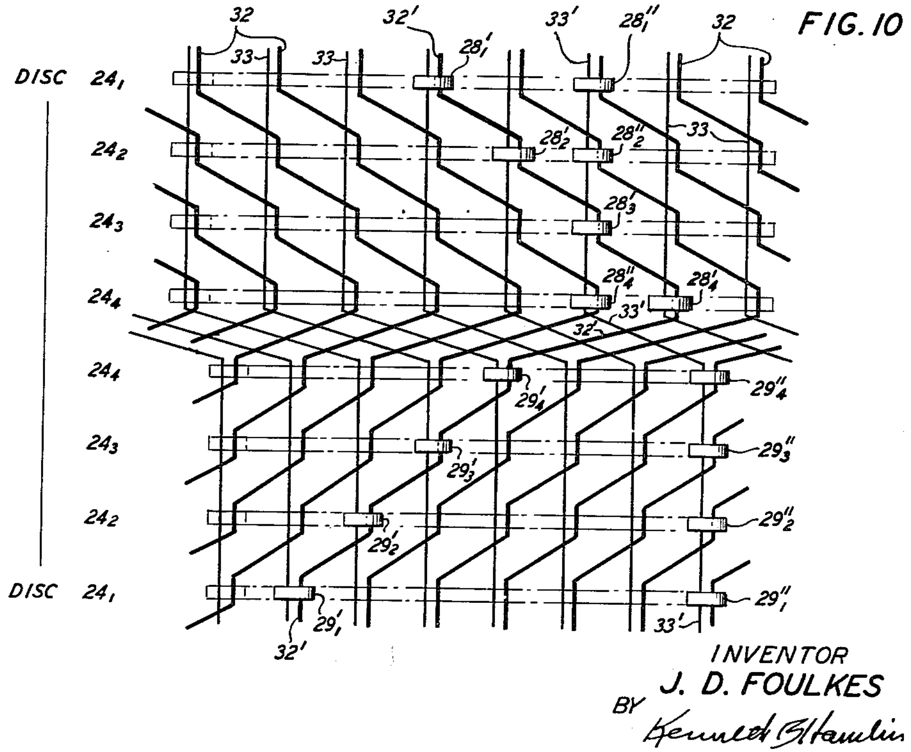
Figure 11:
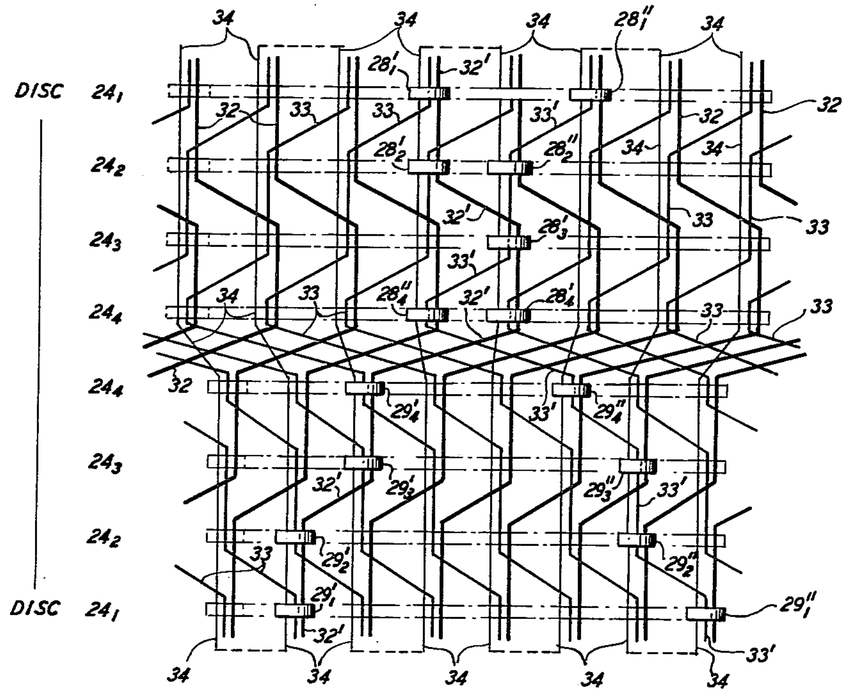

FIG. 10 is a diagrammatic presentation similar to that of FIG. 9 showing the cores after relative rotation with the first columnar conductors assuming a lateral displacement due to the rotation; second columnar conductors are shown as threading the cores; and FIG. 11 is a diagrammatic presentation similar to that of FIGS. 9 and 10 showing the cores after a second relative rotation with a read-out conductor continuously threaded therethrough.

Figure 1:
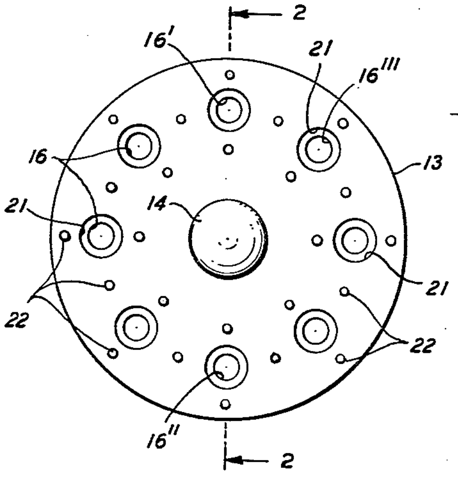
FIG. 1 is an end view of one illustrative matrix structure according to the present invention showing the circular disposition of the toroidal cores in the mounting discs as seen through apertures in the enclosing plates.
Figure 2:
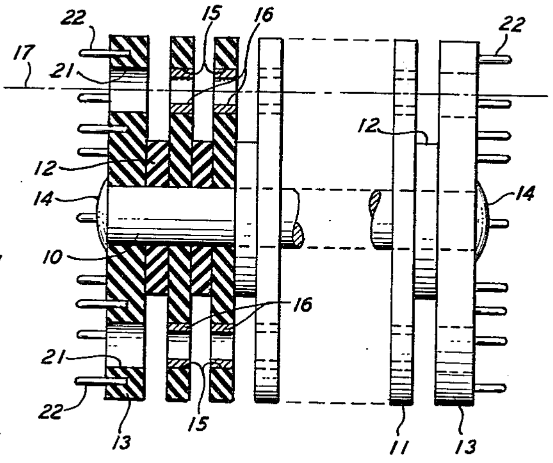
FIG. 2 is a sectional view of the matrix structure taken along the line 2—2 of FIG. 1 showing the relative disposition of the core mounting discs and separating washers on the mounting spindle.

Referring now to the drawing and particularly to FIGS. 1 and 2 thereof, an illustrative embodiment of this invention is seen to comprise a central spindle 10 on which are rotatably mounted a plurality of non-magnetic discs 11. Maintaining each of the discs 11 in a spaced-apart relationship is a separating washer 12, which washer may also be of a non-magnetic material. The discs 11 are maintained in a stacked position on the spindle 10 by means of a pair of end plates 13 also mounted on the spindle 10. The end plates 13 may be retained on the spindle 10 in any convenient manner such as by upsetting the ends of the spindle 10 as indicated at 14. Each of the non-magnetic discs 11 has a plurality of apertures 15 therein circularly disposed about the axis of the spindle 10 in the fashion as indicated in FIG. 1. Each of the apertures 15 is adapted to have inserted therein and maintained in any suitable manner, such as by gluing, a magnetic core 16. Magnetic cores of the character contemplated herein are well-known in the memory and magnetic switching art and exhibit substantially rectangular hysteresis characteristics. Although the principles of this invention are contemplated as being generally applicable to the construction of memory matrices employing magnetic cores of any configuration, the specific embodiments described herein assume the use of substantially toroidal cores. Accordingly, the apertures 15 are circular and may conveniently be punched in the discs 11.

The discs 11 with their apertures 15 may be substantially congruent such that by relative independent rotations of the discs 11 on the spindle 10 the apertures 15 together with the magnetic cores 16 may be aligned on common axes 17. Thus, in FIG. 2 it is obvious that when the magnetic cores 16 shown are aligned on the common axis 17, corresponding other cores of each of the discs will be aligned along other common axes. The memory matrix shown in FIGS. 1 and 2 is, for purposes of illustration, assumed to be an 8 by 8 matrix. That is, eight discs, each having eight magnetic cores mounted therein, are in turn mounted on the central spindle 10. Obviously arrays of any size may be constructed by simply adjusting the number of discs and/or the number of cores mounted in each disc. With the construction as described, a cylindrical coordinate array of magnetic cores is realized. Thus, before the wiring of the array is completed, the cores 16 physically aligned along the common axes 17 may be regarded as being in the X coordinates and the cores 16 in the circular pattern in the plane of each of the discs 11 perpendicular to the axes 17 may be regarded as being in the Y coordinates.

When the discs 11 have been initially aligned such that corresponding cores 16 of the discs 11 are established along the common axes 17, the first step in the wiring operation may be accomplished. This step may be more clearly understood by reference to FIG. 3 in which the cylindrical coordinate arrangement of FIGS. 1 and 2 is envisioned as being unrolled and presented in rectangular coordinate form. That is, the circular Y coordinates are here presented in conventional linear form rather than the actual arrangement of this invention. Assume for purposes of description the cores 16 as shown aligned along the axis 17 of FIG. 2 to be the cores $\mathbf{16}_1'$ through $\mathbf{16}_8'$ of FIG. 3. Corresponding cores such as the cores $\mathbf{16}_1''$ through $\mathbf{16}_8''$ will also be similarly aligned along common axes as shown.

Figure 3:
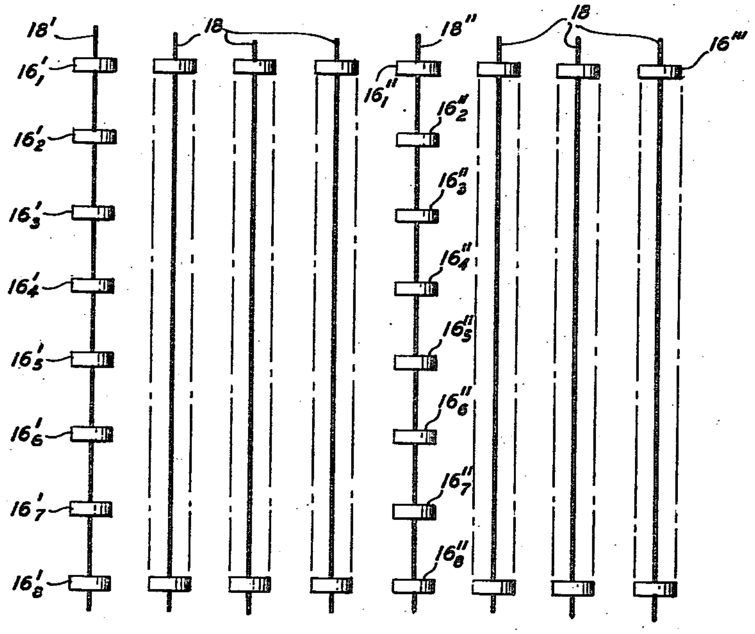
FIG. 3 is a diagrammatic presentation of the relative positions of the cores of this invention envisioned as unrolled from the actual cylindrical arrangement; the cores are shown in an illustrative first alignment with first columnar conductors threaded therethrough.

The direction in which the unrolling of the cylindrical arrangement of FIGS. 1 and 2 is envisioned may be seen from the relative positions of the cores 16′ and 16″ in FIGS. 2 and 3. The core 16‴ is also to be understood in FIG. 3 as being immediately followed by the core 16′ as depicted in FIG. 2. Thus a counterclockwise rotation of a disc 11 with respect to other discs 11 as viewed in FIG. 1 corresponds to a shift to the right of a Y coordinate row with respect to other Y coordinate rows as viewed in FIG. 3. When the cores have been thus aligned each of the columns of cores may be threaded by a first group of conductors 18 which conductors may be regarded as falling in the proximity of the axes 17 of the columns of cores. The conductors threading the cores 16′ and 16″ have been specially designated as 18′ and 18″, respectively.

When this first threading operation has been accomplished the discs 11, with the exception of the disc mounting the cores $\mathbf{16}_1$, are independently and relatively rotated such that the corresponding cores of each of the discs have been advanced one core position with respect to the cores of the disc mounting the next preceding Y coordinate cores. This rotation is clearly illustrated in FIG. 4 where the Y coordinate rows of the cores $\mathbf{16}_2$ through $\mathbf{16}_8$ are shown as having been respectively shifted one to seven positions to the right resulting in the new coordinate array as shown. As a result the cores 16′ now fall on a diagonal of the coordinate array, the threading conductor 18′ describing the diagonal. Obviously in the actual form of the construction of this invention the cores 16′ and threading conductor 18′ would describe a helical path rather than the diagonal one plotted in FIG. 4. Accordingly, to maintain a precise correspondence to the actual cylindrical arrangement the diagonals describing the new alignment of the cores 16 in FIG. 4 are shown as discontinuous and the illustrative conductor 18″ threading the cores 16″ is shown continued by means of a broken line.

Figure 4:
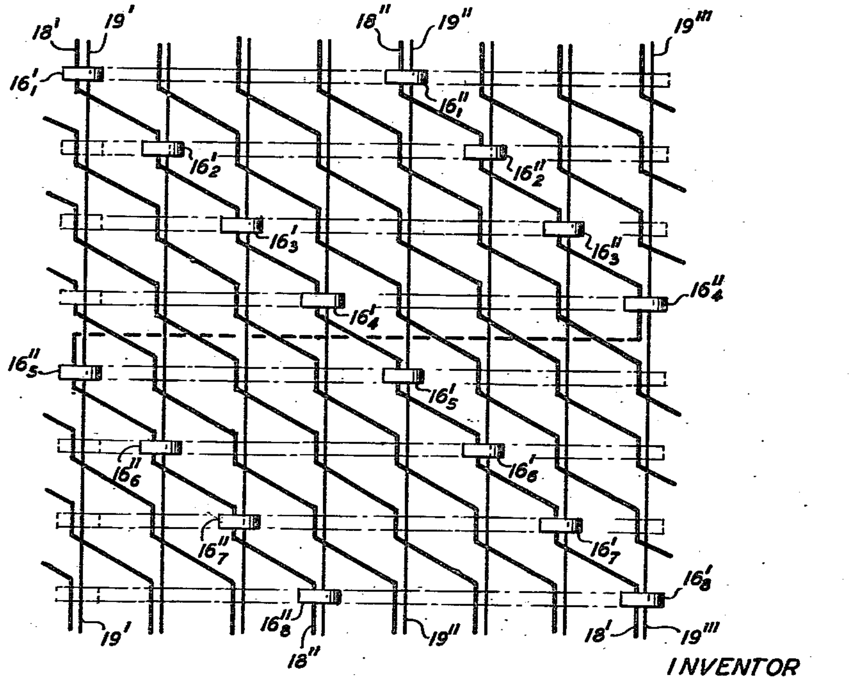
FIG. 4 is a diagrammatic presentation similar to that of FIG. 3 showing the cores after relative rotation with the first columnar conductors now assuming oblique positions due to the rotation of the mounting discs and with second columnar conductors threading the cores.

The columns of cores of the new coordinate array of FIG. 4 are now threaded with a second group of conductors 19 as the second step in the wiring operation. Thus, for example, the conductor 19′ threads the column including the cores $\mathbf{16}_1'$ and $\mathbf{16}_5''$; the conductor 19″ threads the column including the cores $\mathbf{16}_1''$ and $\mathbf{16}_5'$; and the conductor 19‴ threads the column including the cores $\mathbf{16}_1'''$, $\mathbf{16}_2''$ and $\mathbf{16}_8'$. Another relative rotation of the discs 11 is now effected preparatory to the third wiring step in the fabrication of the memory matrix. The latter rotation is performed in a predetermined manner to obtain the particular wiring pattern of the matrix desired. In the present embodiment it will be assumed that a basic coincident current matrix is to be constructed. Such a matrix would have a pair of X and Y coordinate read and write conductors which conductors define the particular information addresses of the coordinate array matrix and a single read-out or sensing conductor threading all of the cores.

To achieve such a matrix in accordance with the principles of this invention the second relative rotation of the core discs 11 will be in a clockwise direction as viewed in FIG. 1. Accordingly, in the rectangular presentation of FIG. 4 the horizontal shift of the Y coordinate rows will be to the left. In addition, to achieve the proper relationship of the conductors 18 and 19, particular discs will be rotated together in pairs. Thus, in the second rotation, the disc 11 mounting the core $\mathbf{16}_1$ will not be rotated as was the case during the first rotation but the discs 11 mounting the cores $16_2$ and $16_3$ will be rotated together one core position in a clockwise direction as viewed in FIG. 2. Subsequent disc pairs mounting the cores $16_4$ and $16_5$, and $16_6$ and $16_7$ will be rotated 2 and 3 core positions in a clockwise direction, respectively. The disc 11 mounting the cores $16_8$ will then alone be further rotated four core positions in a clockwise direction to complete the rotation operation. The resulting new coordinate arrangement of the core array is represented rectilinearly in FIG. 5. This array now shows the cores 16′ and 16″, which originally were aligned in parallel columns in FIG. 3, as having assumed staggered positions as the result of the effective paired rotation in a clockwise direction as viewed in FIG. 1. The conductors 19 as illustrated by the illustrative conductors 19′, 19″, and 19‴ have also assumed a staggered alignment in accordance with the relative positions of the cores which they thread. The continuous helical paths of the conductor in the actual embodiment of this invention are again indicated by the illustrative conductor 19′ continued by means of a broken connecting line. The conductors 18 as illustrated by the conductors 18′ and 18″ have similarly assumed staggered alignments in accordance with the relative positions of the cores which they thread and the relative rotations of the mounting discs 11.

The columns of cores of the coordinate array last achieved may now be threaded by a third group of conductors 20. Thus, for example, the column of cores including the cores $16_1'$ and $16_2'$ is threaded by the conductor 20′; and the column of cores including the cores $16_1'''$, $16_7''$ and $16_8''$ is threaded by the conductor 20″. The third group of conductors 20 may be connected as indicated by the broken line segments in FIG. 5 to form a continuous conductor threading each of the columns of cores in alternate directions. This conductor, made up of the conductors 20, conveniently constitutes the read-out or sensing conductor for the matrix in a manner to be described hereinafter. The wiring of a basic magnetic core coincident current matrix structure according to the principles of this invention has now been completed. The effective resulting coordinate array realized however will obviously not coincide with the physical coordinate disposition of the cores. Thus, in FIG. 5, assume the conductors 18 to constitute the effective X coordinate conductors and the conductors 19 to constitute the effective Y coordinate conductors. Then the effctive equivalent coordinate array of cores is that shown in FIG. 6. The X and Y coordinate conductors 18 and 19, respectively, assume their conventional relationships in the latter figure. The cores however are now functionally rearranged in conformity with the coordinate relationship of the threading conductors and the coincident current mode of operation. The equivalency of the arrays depicted in FIGS. 5 and 6 may be tested by noting the cores on any particular coordinate conductor of each. For example, referring to FIG. 5, it is evident that the X and Y coordinate conductors 18″ and 19″, respectively, define the address of the core in row *a*, column 5, of that array, which core may accordingly be here designated as core *a*5. In addition to the core *a*5, the X conductor 18″ also threads similarly designated cores *b*5, *c*6, *d*6, *e*7, *f*7, *g*8, and *h*8. Similarly, in addition to the core *a*5, the Y conductor 19″ also threads the cores designated *b*4, *c*4, *d*3, *e*3, *f*2, *g*2, and *h*1. A comparison of these conductors with the same conductors shown in conventional relationship in FIG. 6, shows them to thread the same cores in the same functional, although not physical, sequence. The X coordinate conductor 18″ threading the core *a*5 in the array of FIG. 6 thus also threads the cores *c*6, *d*6, *e*7, *f*7, *g*8, *h*8, and *b*5. Similarly in FIG. 6, the Y coordinate conductor 19″, also threading the core *a*5, also threads the cores *g*2, *f*2, *e*3, *d*3, *c*4, *b*4, and *h*1. This comparison may be made in a similar manner for each of the other X and Y coordinate conductors to show the equivalency of the FIGS. 5 and 6.

Figure 5:
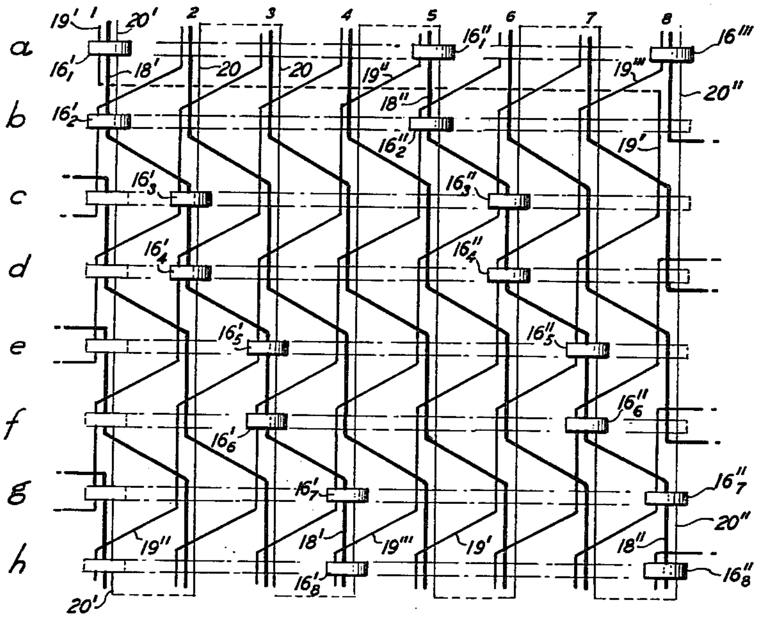
FIG. 5 is a diagrammatic presentation similar to that of FIGS. 3 and FIGS. 4 showing the cores after a second relative rotation with a read-out conductor continuously threaded therethrough.
Figure 6:
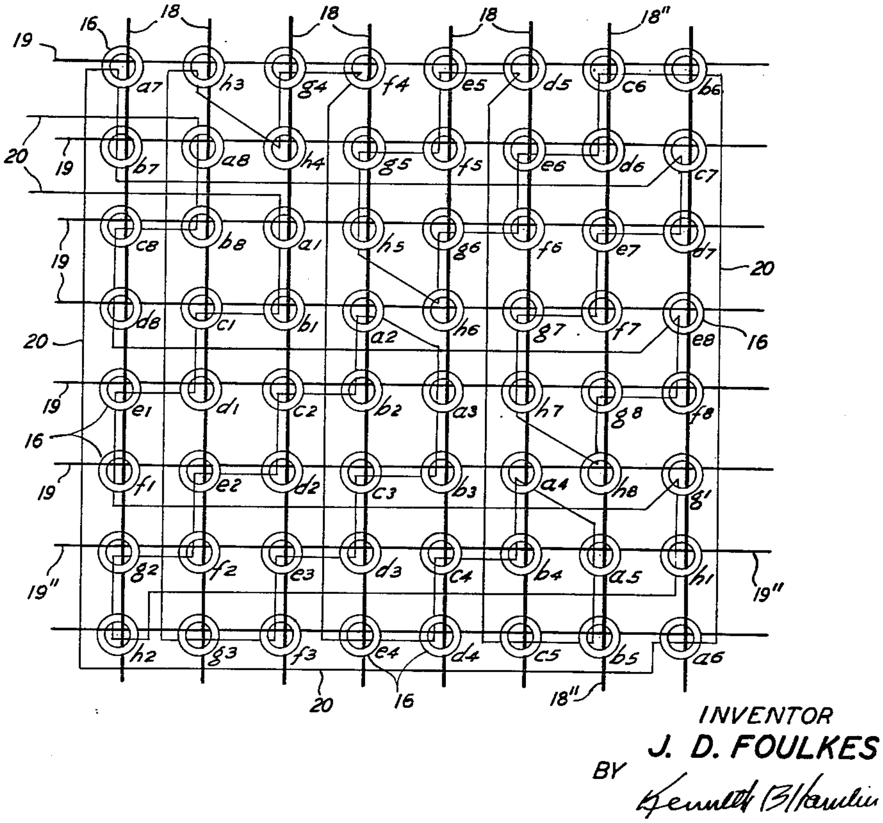
FIG. 6 shows the effective equivalent coordinate array of the physical coordinate arrangement of the cores of FIG. 5 with the cores shown in plan view.

Because of the rearrangement of the cores in FIG. 6, the read-out conductor 20 will assume a considerably different physical pattern than the regular alternating one of FIG. 5. However, the cores of the equivalent array are threaded by the continuous conductor 20 in precisely the same physical sequence as is the case in the actual physical relationship of the cores of the invention as presented in unrolled presentation in FIG. 5. This is readily ascertained from a comparison of the sequences of the particular cores threaded by the conductor 20 in each of the FIGS. 5 and 6. It should further be noted that the conductor 20 threads the cores of any particular row or column of the equivalent array in such a manner that half the cores of the row or column are threaded in one direction and the other half in the opposite direction.

Returning now to the actual physical organization of this invention as depicted in FIGS. 1 and 2, it will be recalled that a pair of end plates 13 maintain the discs 11 and washers 12 in a stacked position on the spindle 10. Each of the end plates 13 is provided with a plurality of apertures 21 having the same circular disposition with respect to the axis of the spindle 10 as the apertures 15 in each of the disc 11 maintaining the cores 16. In addition, each of the end plates 13 is provided with a plurality of electrical terminals 22 mounted thereon in any convenient manner. The terminals 22 may advantageously comprise pins protruding from the plates 13 and will be equal in number to the total number of coordinate and read-out conductors associated with each individual core of the matrix. In the illustrative embodiment being described, each plate 13 will accordingly have 24 such terminals or pins 22 provided thereon.

The threading of the matrix in each of its rotational positions is accomplished through the apertures 21 of the end plates 13 and when the threading operation has been completed, the ends of the threading wires may conveniently be connected to corresponding terminals 22 of the plates 13. The interconnections between the conductors 20 shown in FIG. 5 to achieve a single continuous read-out conductor may similarly be made between appropriate terminals 22 of the end plates 13. To facilitate the rotation of the discs 11 after each threading operation obviously sufficient slack is allowed in the threading wires. This slack is readily taken up when the wiring is completed before the conductors are connected to the terminals 22.

The principles of this invention are obviously applicable to other magnetic storage arrangements than that of the illustrative embodiment described hereinbefore. Thus, instead of non-magnetic discs 11 having conventional toroidal cores 16 inserted in apertures 15 therein, the discs 11 may themselves be of a magnetic material having a substantially rectangular hysteresis characteristic. The periphery of each of the apertures 15 may then define a magnetic core in accordance with the principles of the invention described in the copending application of R. L. Ashenhurst and R. C. Minnick, filed December 31, 1953, Serial No. 401,465, now Patent No. 2,912,677, issued November 10, 1959. Similarly, the discs 11 may each comprise a magnetic structure such as that described by R. C. Minnick in the copending application filed September 13, 1954, Serial No. 455,658, now abandoned.

Figure 7:
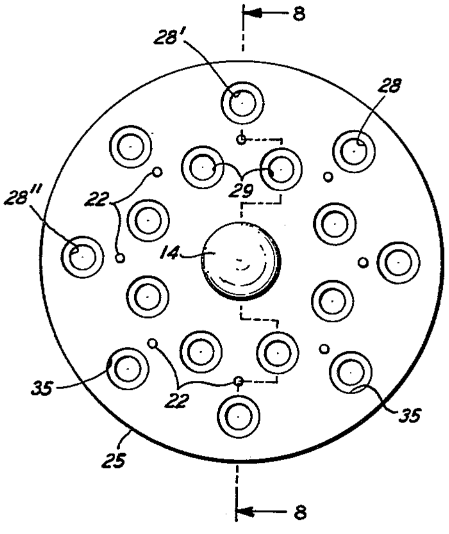
FIG. 7 is an end view of another illustrative matrix structure according to the principles of this invention.
Figure 8:
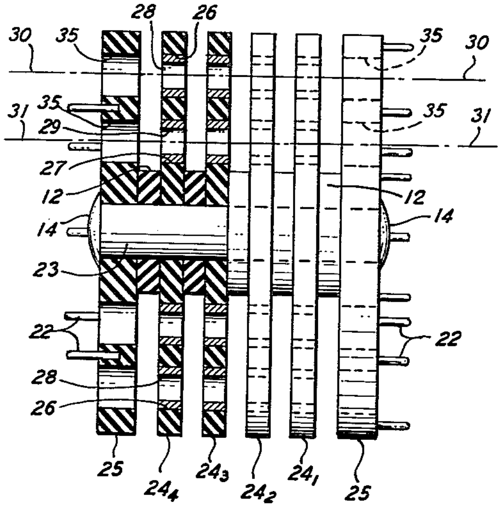
FIG. 8 is a sectional view taken along the line 8—8 of FIG. 7.

FIGS. 7 and 8 show another illustrative embodiment in which the principles of this invention are applied to achieve a still more compact matrix arrangement. This matrix construction also provides for an 8 x 8 array but utilizes only four discs instead of eight as was the case in the construction of FIGS. 1 and 2. A central spindle 23 again comprises the means on which a plurality of non-magnetic discs 24 are rotatably mounted. The discs 24 are again held in a spaced-apart relationship by separating washers 12 identical to those also employed in the arrangement of FIGS. 1 and 2 and also mounted on the spindle 23. A pair of end plates 25 mounted on each end of the spindle 23 maintain the discs 24 and washers 12 in a stacked position. The end plates 25 may again be held on the spindle 23 by upsetting the ends of the spindle 23 as indicated at 14.

Each of the discs 24 is provided in this case with a first and a second plurality of apertures 26 and 27, respectively, arranged in two concentric circles about the axis of the spindle 23. The apertures 26 and 27 are located on radii of the concentric circles with equal angles between the radii as depicted in FIG. 7. In each of the apertures 26 is inserted a magnetic core 28 and in each of the apertures 27 is inserted a magnetic core 29 in the manner described for the embodiment of FIGS. 1 and 2. The arrangement of the magnetic cores 28 and 29 is now that of two concentric cylinders, with the arrangement of the cores 29 forming the inner cylinder. From another aspect the arrangement of FIGS. 7 and 8 may be considered that of FIGS. 1 and 3 with the rows of cores $16_1$ through $16_4$ of the latter figures being drawn outwardly and down over the rows of cores $16_5$ through $16_8$. Since the embodiment being described also constitutes an 8 x 8 array each circle of cores of each of the discs 24 will contain 8 cores to make up the physical disposition of the cores in coordinate formation. From a comparison of the arrangement of FIGS. 7 and 8 with that of FIGS. 1 and 2 it is obvious that each column of cores of the arrangement of the latter figures is made up of a corresponding core 28 and a corresponding core 29 of each of the discs 24. Accordingly, preparatory to the first step of the wiring operation of this embodiment, a series of corresponding cores 28 of the discs 24 will be aligned on a common axis 30 as indicated in FIG. 8. Since the discs 24 of this embodiment are also substantially congruent another series of corresponding cores 29 of the discs 24 will then also be aligned on a common axis 31 as also indicated in FIG. 8. In a similar manner the remaining corresponding cores 28 and 29 of the discs 24 will also be aligned along common axes.

The wiring operation is performed in a manner substantially similar to that also employed for the embodiment of FIGS. 1 and 2. Assume the threading to be accomplished from the right hand side of the matrix stack as viewed in FIG. 8, which side will also be considered as the bottom of the structure. A group of conductors 32 is threaded through each of the four-core columns of cores 28 of the outer cylinder of cores in one direction and then threaded in the opposite direction through corresponding four-core columns of cores 29 of the outer cylinder of cores. The conductors 32 will thus emerge from the same side of the matrix structure. The corresponding four-core columns of cores 29 selected for return threading may advantageously be two positions removed from the columns of cores 28 for purposes of isolation. The first threading operation is graphically illustrated in FIG. 9 where the matrix structure is envisioned as unfolded to a single cylindrical arrangement and then unrolled. The inner cylindrical cores 29 are represented by the lower tier of cores and the outer cylindrical cores 28 are represented by the upper tier of cores. Thus the upper and lower row of cores of the substantially coordinate array of FIG. 9 are both physically located on the first or bottom disc $24_1$ of the matrix structure of FIGS. 7 and 8. The direction in which the unfolded matrix cylinder is envisioned as being unrolled may be seen from the relative positions of the cores 28′ and 28″ in FIGS. 7 and 9.

After the first threading operation an effective coordinate arrangement of cores 28 and 29 is achieved as depicted in FIG. 9. Each physical X coordinate column is displaced at its middle two core positions, and a typical column is one threaded by the X coordinate conductor 32′. Making up this typical column are the cores $28_1'$, $28_2'$, $28_3'$, $28_4'$, $29_4'$, $29_3'$, $29_2'$, and $29_1'$ and it should be noted that the cores of this column bearing the same subscripts are in actual fact located on the same mounting disc 24. Other columns of the array are threaded in an identical manner by other X coordinate conductors 32.

The discs 24 may now be rotated relative to each other preparatory to the second step in the threading operation. Assuming each disc 24, with the exception of the first disc $24_1$, to be rotated in a counterclockwise direction as viewed in FIG. 7 so that corresponding cores 28 or 29 in the discs 24 will be displaced one core position with respect to the corresponding core of the immediately preceding disc, a new effective coordinate alignment will result as depicted in FIG. 10. A translation of the relative rotation of the discs 24 as described above into terms of the effective rectilinear coordinate array results in a shift to the right of each of the rows $24_2$, $24_3$, and $24_4$ of FIG. 9. A new pattern of wiring results with respect to the conductors 32 and the new arrangement of the cores 28 and 29 in the cylinders of the matrix structure is apparent from FIG. 10 when noting the new positions of the cores on the illustrative conductor 32′.

The Y coordinate conductors 33 may now be threaded in the manner similar to that of the X coordinate conductors 32. For the Y coordinate conductors 33 the displacement of core positions between the four-core half-columns of cores 28 and 29 however may advantageously be in the opposite direction as indicated in FIG. 10. Thus an exemplary Y coordinate conductor 33′ may be traced through an effective column of cores comprising the cores $28_1''$, $28_2''$, $28_3''$, $28_4''$, $29_4''$, $29_3''$, $29_2''$ and $29_1''$. The discs 24 may now be rotated relative to each other preparatory to the final wiring step in the construction of a basic magnetic core coincident current memory matrix according to the principles of this invention. The second relative rotation in this embodiment is similar to that of the embodiment of FIGS. 1 and 2. The discs $24_2$ and $24_3$ are rotated together in a clockwise direction as viewed in FIG. 7, which corresponds to a shift to the left of the corresponding rows in FIG. 10, one core position as to the cores on either of the concentric core circles of the discs. The disc 24 is rotated two such core positions also in a clockwise direction as viewed in FIG. 7. The new effective coordinate alignment is shown in FIG 11.

The final wiring step is now accomplished by threading the newly aligned cores with columnar conductors 34. These may also be connected as indicated in FIG. 11 by the broken line segments to form a continuous read-out conductor 34 threading the columns in alternating directions. For convenience the conductors 34 may be cause to emerge from the structure at the opposite end from the X and Y coordinate conductors 32 and 33, respectively. The final representative array shown in FIG. 11 may be demonstrated to have a functionally equivalent coordinate array as was done for purposes of description in FIG. 6. Thus by simply tracing each of the X and Y coordinate conductors and determining the particular magnetic cores at the addresses of their intersections such as effective equivalent array may also be plotted from the diagram of FIG. 11.

Returning again to the physical construction of the embodiment of FIGS. 7 and 8, the end plates 25 are also seen to have provided therein a plurality of apertures 35 substantially in alignment with the apertures 26 and 27 of the discs 24 in which the cores 28 and 29, respectively, are inserted. Also provided on each of the end plates 25 are a plurality of electrical terminals 22, which may in this case also advantageously comprise pins adapted to be inserted in associated circuit elements, not shown. The pins or terminals 22 of the bottom plate 25 will be sixteen in number and the ends of the X and Y coordinate conductors 32 and 33, respectively, may conveniently be connected to corresponding ones of these terminals 22. Should the connections between the read-out conductors 34 be made at the bottom plate 25 then an additional eight terminals 22 must be provided on that plate. However, these latter terminals may conveniently be provided on the other end plate 25 thereby making possible the connections between the read-out conductors 34 at the opposite end of the structure from the connections of the X and Y coordinate conductors.

It should be noted that the illustrative embodiment of FIGS. 7 and 8 equally well lends itself to the utilization of other specific magnetic storage elements. Thus, for example, the principles described by R. L. Ashenhurst and R. C. Minnick in the copending applications previously cited herein may also be applied in the embodiment last described. Further, although two illustrative matrix structures have been described, each of which applies the principles of this invention to realize one basic wiring pattern other wiring patterns may obviously be achieved. Thus, additional conductors beside the typical three described may be threaded through the cores or other coordinate relationships may be established between the threading conductors by simply varying the relative rotation of the discs to suit the specific pattern desired.

A further illustrative embodiment applying the principles of this invention may be realized by the addition in each of the non-magnetic discs of the embodiments shown in FIGS. 1, 2, 7, and 8, of apertures in which no magnetic cores are inserted. The latter apertures would also be alignable along common axes and may conveniently be disposed along the same circle as that of the disposition of, say, the cores 16 of FIG. 1. By means of the addition of such bare apertures, an array of cores can be threaded with a conductor which links an arbitrary pattern of cores to set into the matrix, for example, information representative of system programming.

What have been described are considered to be illustrative embodiments of the present invention and it is to be understood that various and numerous other arrangements thereof may be devised by one skilled in the art without departing from the spirit and scope of this invention.

What is claimed is:

1. A magnetic core memory matrix construction comprising a plurality of core mounting means, a plurality of magnetic cores mounted in each of said mounting means, each of said mounting means being movable relative to each other such as to determine said cores in selected alignments, and a plurality of conductors threading said cores in each of said selected alignments.

2. A magnetic core memory matrix construction comprising a plurality of core mounting means, a plurality of magnetic cores mounted in each of said mounting means, means positioning said mounting means so that said mounting means are movable relative to each other such as to determine said cores in a plurality of alignments, and a plurality of conductors threading said cores in each of said plurality of alignments.

3. A magnetic core memory construction comprising a plurality of core mounting means having a common axis, a plurality of magnetic cores mounted in each of said mounting means about said common axis, each of said mounting means being movable about said axis relative to the others of said mounting means such as to rotate said cores in predetermined alignments, and a plurality of conductors threading said cores in each of said predetermined alignments.

4. A magnetic core memory construction comprising a spindle, a plurality of core mounting means mounted on said spindle in a spaced-apart relationship, a plurality of magnetic cores mounted in each of said mounting means about said spindle, each of said mounting means being rotatable in predetermined increments such as to arrange said cores in particular alignments, and a plurality of conductors threading said cores in each of said particular alignments.

5. A magnetic core construction comprising a spindle, a plurality of non-magnetic discs mounted on said spindle in a spaced-apart relationship, a plurality of magnetic cores mounted in each of said discs about said spindle, each of said discs being rotatable relative to the others of said discs to move said cores into predetermined alignments, end plates mounted on said spindle, each of said plates having a plurality of electrical terminal means thereon, and a plurality of conductors threading said cores at each of said predetermined alignments and being connected to the electrical terminal means of each of said end plates.

6. In a magnetic core matrix construction, means for determining wiring patterns of said cores comprising means for mounting said cores in rows and columns to define a coordinate array, means for moving said rows relative to each other to define other coordinate arrays, and conductors threading said cores of said columns in each of said coordinate arrays.

7. In a magnetic core matrix construction, means for determining wiring patterns of said cores comprising means for mounting said cores in circular rows and in columns to define a cylindrical coordinate array, means for rotating said rows relative to each other to define other cylindrical coordinate arrays, and conductors threading said cores of said columns in each of said cylindrical coordinate arrays.

8. In a magnetic core construction having a plurality of cores having a common axis, means for determining particular wiring patterns of said cores comprising means for shifting particular ones of said cores to other axes, and a plurality of conductors threading the cores on each of said axes.

9. In a magnetic core construction having a plurality of cores, said cores being arranged on a plurality of common axes, means for determining particular wiring patterns of said cores comprising means for shifting particular ones of said cores on each of said common axes to other axes, and a plurality of conductors threading the cores on each of said common and said other axes.

10. A memory matrix construction comprising a plurality of mounting means, a plurality of bistable elements mounted on each of said mounting means, each of said mounting means being movable relative to each other to arrange said bistable elements in predetermined relationships, and a plurality of energizing means associated with said elements in each of said predetermined relationships.

11. A memory matrix construction comprising a plurality of mounting means arranged in a spaced-apart relationship on a common axis, a plurality of bistable elements mounted on each of said mounting means, each of said mounting means being rotatable on said axis relative to each other such as to move the bistable elements of each of said mounting means into predetermined relationships with the bistable elements of others of said mounting means, and a plurality of energizing conductors coupled to said elements in each of said predetermined relationships.

12. A magnetic core memory matrix construction comprising a spindle, a plurality of non-magnetic discs mounted on said spindle in a spaced-apart relationship, a first plurality of magnetic cores mounted in each of said discs about said spindle, a second plurality of magnetic cores mounted in each of said discs concentrically with said first plurality of magnetic cores, each of said discs being rotatable about said spindle to bring said first and second pluralities of magnetic cores in each of said discs into predetermined alignments with the first and second pluralities of magnetic cores in others of said discs, and a plurality of conductors threading the cores of said first and said second pluralities of magnetic cores in each of said predetermined alignments.

13. A magnetic core memory matrix construction according to claim 12 in which said plurality of conductors thread the cores of said first plurality of magnetic cores in one direction and the cores of said second plurality of magnetic cores in the opposite direction in each of said predetermined alignments.

14. A magnetic core memory matrix construction according to claim 13 also comprising an end plate mounted on said spindle, and a plurality of electrical terminals mounted on said end plate, the ends of each of said plurality of conductors being connected respectively to said electrical terminals.

15. A magnetic core memory matrix construction according to claim 14 in which said electrical terminals comprise plug-in members.

16. A magnetic core structure comprising a spindle, a plurality of discs rotatably mounted on said spindle, each of said discs having a plurality of apertures therein, means defining a magnetic core at each of said apertures, and wires threading the apertures of each of said discs in predetermined alignments.

17. A magnetic core structure comprising a spindle, a plurality of non-magnetic discs rotatably mounted on said spindle, each of said discs having a plurality of apertures therein, magnetic cores mounted in each of said apertures, and wires threading the magnetic cores of each of said discs in predetermined alignments.

18. A magnetic core memory construction comprising a spindle, a plurality of non-magnetic discs mounted on said spindle in a spaced-apart relationship, each of said discs having a plurality of apertures therein disposed about said spindle, a plurality of magnetic cores mounted in predetermined ones of said apertures in each of said discs, each of said discs being rotatable about said spindle to bring said apertures and said magnetic cores in each of said discs into predetermined alignments with the apertures and magnetic cores in others of said discs, and a plurality of conductors threading said apertures and cores in each of said predetermined alignments.

References Cited in the file of this patent

UNITED STATES PATENTS

| | | |
|---|---|---|
| 2,724,103 | Ashenhurst | Nov. 15, 1955 |
| 2,732,542 | Minnick | Jan. 24, 1956 |
| 2,743,507 | Kornei | May 1, 1956 |
| 2,746,130 | Davis | May 22, 1956 |
| 2,784,391 | Rajchman et al. | Mar. 5, 1957 |
| 2,877,540 | Austin | Mar. 17, 1959 |
| 2,878,463 | Austin | Mar. 17, 1959 |